United States Patent [19]

Nitzschke et al.

[11] Patent Number: 5,186,070
[45] Date of Patent: Feb. 16, 1993

[54] GEAR-CHANGE DEVICE FOR THE TRANSMISSION OF A MOTOR VEHICLE

[75] Inventors: Rüdiger Nitzschke, Friedrichshafen; Martin Schetter, Schwäbisch, both of Fed. Rep. of Germany

[73] Assignee: Zahnradfabrik Friedrichshafen AG, Fed. Rep. of Germany

[21] Appl. No.: 773,936
[22] PCT Filed: Jun. 5, 1990
[86] PCT No.: PCT/EP90/00879
 § 371 Date: Oct. 29, 1991
 § 102(e) Date: Oct. 29, 1991
[87] PCT Pub. No.: WO90/15272
 PCT Pub. Date: Dec. 13, 1990

[30] Foreign Application Priority Data

Jun. 10, 1989 [DE] Fed. Rep. of Germany ....... 3919100

[51] Int. Cl.5 ............................................. F16H 63/36
[52] U.S. Cl. ........................................................ 74/477
[58] Field of Search ............................................ 74/477

[56] References Cited

U.S. PATENT DOCUMENTS

| 2,220,543 | 11/1940 | Peterson | 74/477 X |
| 2,366,655 | 1/1945 | Russey | 74/477 |
| 3,242,759 | 3/1966 | Magg et al. | 74/477 |
| 3,444,752 | 5/1969 | Fisher et al. | 74/477 |
| 3,486,392 | 12/1969 | Ivanchich | 74/477 |
| 3,527,116 | 9/1970 | Kimberlin | 74/477 X |

FOREIGN PATENT DOCUMENTS

| 580908 | 7/1933 | Fed. Rep. of Germany ........ 74/477 |
| 2015105 | 10/1971 | Fed. Rep. of Germany . |
| 2125278 | 11/1972 | Fed. Rep. of Germany . |
| 774824 | 5/1957 | United Kingdom . |
| 1031400 | 6/1966 | United Kingdom . |

Primary Examiner—Allan D. Herrmann
Attorney, Agent, or Firm—Davis, Bujold & Streck

[57] ABSTRACT

In a gear-change device for the transmission of a motor vehicle to whose gear-change levers (23, 24 and 25) are fastened locking levers (29, 30 and 31) having locking grooves (32), when one of said gear-change levers (23, 24 or 25) pivots from its neutral position to a shift position, the other gear-change levers (23, 24 or 25) are locked in their neutral position via locking elements. The locking elements are designed, at the same time, in a manner such as to be universally applicable irrespective of the position of the gear-change levers. According to the invention, the locking elements are designed as two-arm rockers (34 and 35) supported parallel to the swivel bearing (26) of the gear-change levers (23, 24 and 25) and engaging in the locking grooves (32) via locking cams (33).

6 Claims, 2 Drawing Sheets

GEAR-CHANGE DEVICE FOR THE TRANSMISSION OF A MOTOR VEHICLE

The invention concerns a gear-change device for the transmission of a motor vehicle comprising fork-like shift elements, preferably gear-change levers, which engage in sliding sleeves and via at least one gear-shift shaft are pivotable around parallel swivel bearings from their neutral position into shift positions, locking means stationarily situated in the transmission housing coacting with locking grooves formed in locking levers fastened to the gear-change levers in a manner such that when one gear-change lever pivots into a shift position, the other gear-change levers are locked in their neutral position.

DESCRIPTION OF THE RELATED ART

A gear-change device a of the above kind has been disclosed in DE-OS 21 25 278. Three balls offset by 120° in respect to each other are situated in a central ball cage and overlapped by fork-like end sections of the locking levers. If one gear-change lever is pivoted around its swivel bearing, the fork-like section of the locking lever connected with the gear-change lever moves into the ball cage the balls lying in the notch thereof. Thereby it presses the other two balls into the fork-like ends of the other locking levers. Such a locking system is applicable only with limitations, since the swivel axes of the gear-change levers must be situated in a specific position as symmetrically as possible with respect to the ball cage, as otherwise complicated additional transmission means are required.

Therefore, the invention is based on the problem of providing a system consisting of locking means and locking grooves which can be used for transmissions of different configurations using parts that are as equal and simple as possible.

SUMMARY OF THE INVENTION

This problem is solved by the fact that there is respectively situated between the gear-change levers a twin-arm rocker which is supported in the transmission housing parallel to the swivel bearing and engages in the locking grooves via end-side locking cams. If one of the two gear-change levers is moved from its neutral position to a shift end position, the locking cam in this gear-change lever leaves the locking groove and the rocker, with its locking cam situated in the other leg, exerts its locking action on the opposite gear-change lever. The locking device can be constructed at low cost and require small space. But, in addition, there also obviously exists the possibility of applying the invention to shift forks which are longitudinally movable over selector rails. In this case, a locking element having locking grooves is situated in each shift fork.

In one embodiment of a gear-change device for the transmission of a motor vehicle comprising more than two gear-change levers lockable with respect to each other, the legs of the rockers that face each other must be interconnected by means of transmission elements. If a gear shift is effected in a gear-change lever, the corresponding rocker does not lock only the opposite gear-change lever; the transmission element transmits the movement of the rocker to at least another rocker which engages in the locking groove coordinated therewith. Thus, the locking system can be extended by the transmission elements to several gear-change levers or pairs of gear-change, levers.

The locking lever of a gear-change lever upon which act two rockers must have two oppositely extending locking grooves. The question here is the gear-change levers which are within a serial arrangement of rockers. If such a gear-change lever is actuated, both rockers lock by opposite movements the two respectively adjacent gear-change levers. By the legs of said rockers engaging in locking grooves extending in opposite directions, the transmission elements can be advantageously disposed in a manner such that a serial shift of the rockers is possible.

It is proposed for the locking levers, and the locking grooves to be situated on both sides or on one side of the swivel bearing of the gear-change lever. The adequate design of the locking lever as one-arm or two-arm lever depends on the spatial conditions.

In another embodiment of the invention, the transmission element must be designed as a connecting rod articulated to the two legs facing each other of both rockers. The connecting rod, as simple mechanical part, transmits the swivel movement of one rocker to the other rocker, there being within the series of rockers, aside from the gear-change levers shifted at the time, a respective shift cam engaged in each gear-change lever. At the same time, the connecting rod must be fastened to at least one of the legs via a slot. Said slot is needed in order that when said gear-change lever is actuated, it be possible to remove the locking cams that engage by pairs in the locking grooves opposite to each other.

The connecting rod must be guided via a slot on the swivel bearing of the central gear-change lever. In the connecting rod attached by rivets to the rockers, there is preserved, in this manner, freedom of movement in longitudinal direction while it cannot swivel in a transverse direction.

The invention is not limited to the combination of features of the claims. Other logical possible combinations of the claims and separate features of the claims result for the expert according to the existing problem.

BRIEF DESCRIPTION OF THE DRAWINGS

For further explanation of the invention, reference is had to the drawings where two embodiments are shown in a simplified manner. In the drawings.

DESCRIPTION OF THE PREFERRED EMBODIMENT

Figure 1:
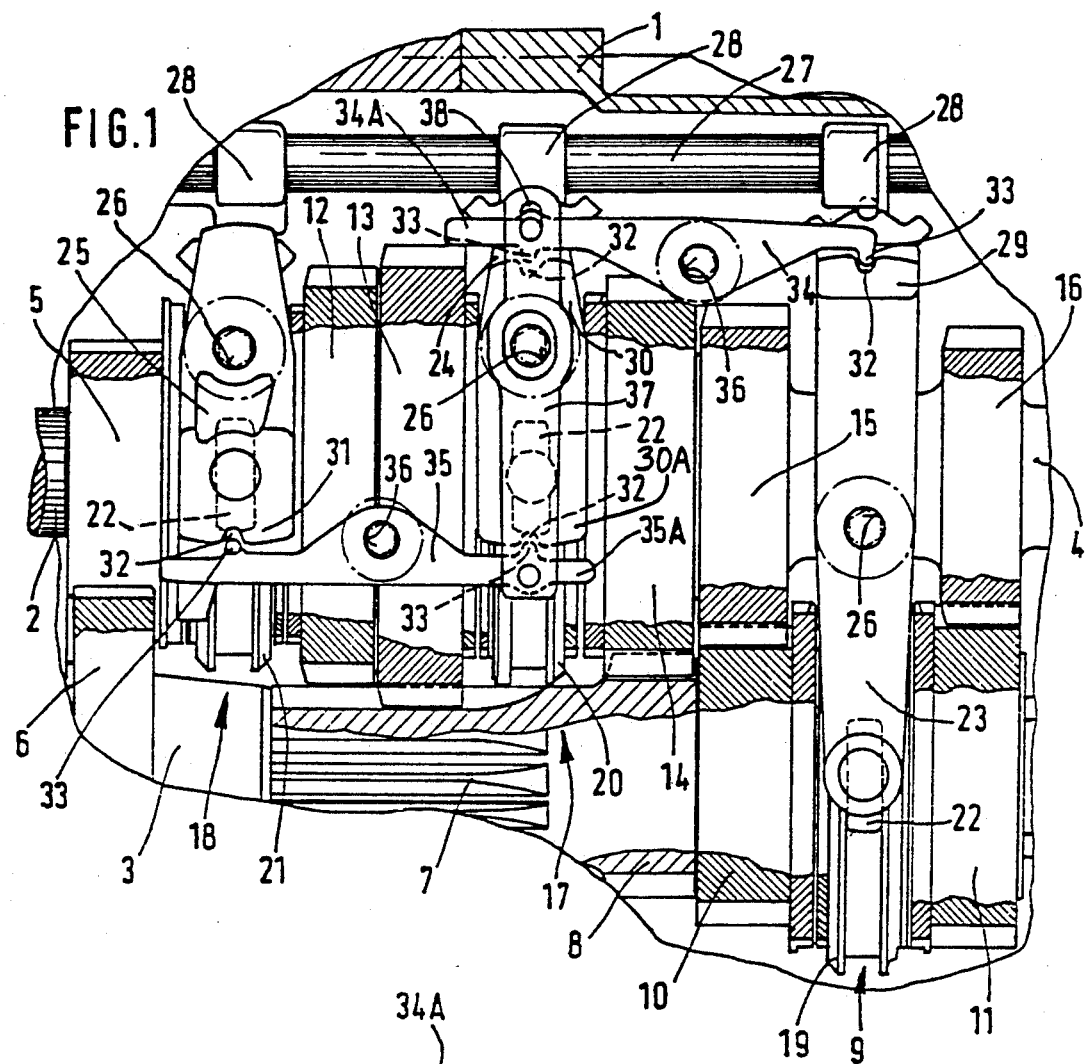
FIG. 1 shows in longitudinal section a partial view of the transmission of a motor vehicle in which rockers are situated between gear-change levers on both sides of their swivel bearings.

In FIG. 1, a transmission housing for the transmission of a motor vehicle is designated by 1 in which is supported an input shaft 2, a countershaft 3 and an output shaft 4. A gear 5, which is in constant engagement with a gear 6 fixedly connected with the countershaft 3, is fixedly connected with the input shaft 2. In addition, the countershaft 3 has fixed gears 7 and 8 and freely rotatable gears 10 and 11 connectable therewith by means of a gear clutch 9. The output shaft 4 is situated coaxially with the input shaft 2, and gears 12, 13 and 14 being freely rotatably situated upon the output shaft 4 and connectable therewith. Additional gears 15 and 16 are fixedly connected with the output shaft 4.

A gear clutch 17 connects, in a left position, the gear 13 with the output shaft 4, whereby a first speed level is engaged. In its right position, the gear clutch 17 connects the gear 14 with the output shaft 4 and the second speed level is engaged. The gear clutch 9, in its left position, attaches the gear 10 to the countershaft 3 so that the third speed level is switched on. A fourth speed level is obtained by a movement of the gear clutch 9 into its right position, the gear 11 being connected with the countershaft 3.

Finally, a gear clutch 18 makes it possible to engage a fifth speed level and a reverse gear of the motor vehicle transmission. In the fifth speed level, the gear clutch 18 is moved to the left so that input shaft 2 and output shaft 4 are directly attached to each other. In the reverse gear, the gear clutch 18 assumes its right position so that the reverse gear 12, which is actuated via a reversing gear, not shown in detail, by the gear 7 of the countershaft 3, is connected with the output shaft 4.

The gear clutches 9, 17 and 18 have sliding sleeves 19, 20 and 21. Sliding pads 22 act radially upon said sliding sleeves which, for their part, are rotatably supported on gear-change levers 23, 24 and 25 of the individual gear clutches 9, 17 and 18. The gear-change levers 23, 24 and 25, designed as two-arm levers, are passed into the transmission housing 1 on swivel bearings 26 and are selectively pivotable via a central selector and gear-shift shaft 27. The selector and gear-shift shaft 27 has shift fingers 28 which, upon a specific rotation of the selector and gear-shift shaft 27, engage in one of the gear-change levers 23 to 25 and, upon a subsequent axial movement of the selector and gear-shift shaft 27, pivot said selected shift lever 23 to 25. It is always to be ensured that only one of the gear clutches 9, 17 or 18 be actuated and that the other gear clutches be locked in their neutral position when unactuated.

For this purpose, locking levers 29, 30, 31 are situated on the respective gear-change levers 23 to 25. The locking levers 29 to 31 each have a locking groove 32 which engage, via locking cams 33, rockers 34 and 35 designed as twin-arm levers. Swivel axes 36 of the rockers extend parallel to the swivel bearings 26 of the gear-change levers 23 to 25.

Locking levers 30 and 30A are provided on both sides of the swivel bearing 26 of the central gear-change lever 17, with the locking grooves 32 of said locking levers, 30 and 30A being designed in opposite directions. The first twin leg rocker 34 engages, with the locking cam 33 of a first leg 34A, in the locking groove 32 of the locking lever 30 while the rocker 35 engages, with its locking cam 33 situated on the first leg 35A, in the locking groove 32 of the locking lever 30A. The first legs 34A and 35A of both rockers 34 and 35 are connected with each other via a connecting rod 37 which is guided on the swivel bearing 26 of the gear-change lever 24. The connecting rod has a slot in its junction with the rocker 34.

Figure 2:
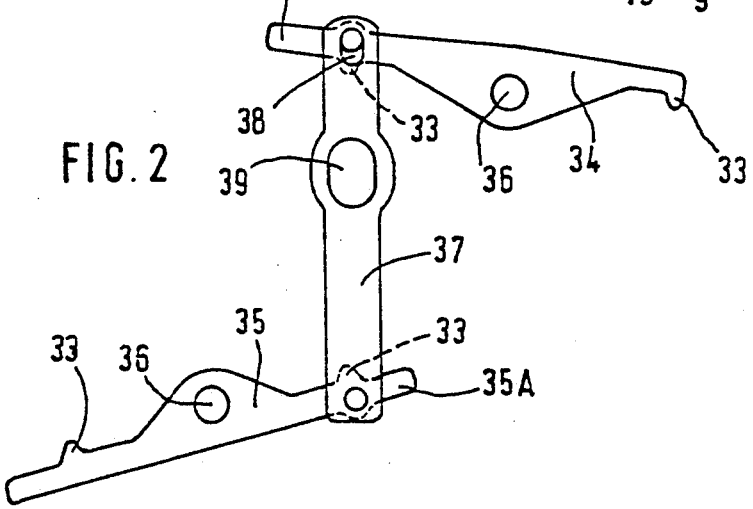
FIG. 2 shows as a separate part of the arrangement according to FIG. 1 two rockers whose legs are interconnected via a connecting rod.

From FIG. 2, both rockers 34 and 35 whose legs 34A and 35A are interconnected by the connecting rod 37 must be understood as separate parts. The connecting rod 37 is fastened to the swivel bearing 26, as can be later seen, via a slot 39.

The device according to FIGS. 1 and 2 operates as follows: If the gear-change lever 24, for instance, is actuated to engage the first or second speed level, the locking cams 33 are moved out of the locking grooves 32 opposite to each other, and both rockers 34 and 35 pivot about their swivel axes 36 and their respective opposite locking cams 33 lock the gear-change levers 23 and 25. Such movement, in opposite directions of the rockers 34 and 35, is made possible by the fact that, on one hand, the connecting rod 37 is fastened to a leg 34A via the slot 38 and, on the other, compensating movements of the connecting rod 37 are made possible by means of the additional slot 39. If the gear clutch 18 is moved over the gear-change lever 25, for instance, then the locking cam 33 reaches the locking lever 31 from the locking groove 32 whereupon said rocker 35 is pivoted into an engaging position of its position locking cam 33 in the locking groove 32 of the locking lever 30. The connecting rod 37 transmits said motion of the leg 35A to the leg 34A of the other rocker 34. Said rocker 34 pivots about its swivel axis 36 and by means of its locking cam 33 locks the locking levers 29 of the gear-change lever 23. When using said locking device according to the invention, extensive freedom exists for the arrangement of the gear clutches. The locking system, which can be used in a large number of gear clutches, can consist of a great number of equal parts so that the manufacturing expenses are altogether relatively low.

Figure 3:
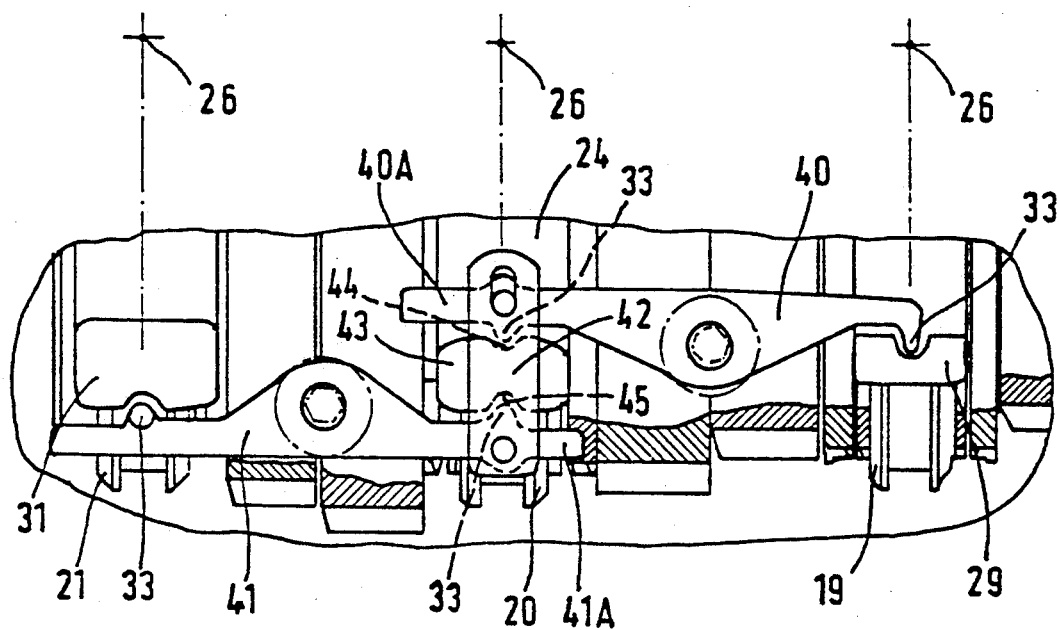
FIG. 3 shows a partial view of another embodiment of the locking device according to the invention in which locking grooves of a central gear-change lever are situated on one side of the swivel bearing of the gear-change lever.

The embodiment of FIG. 3 coincides substantially with that of FIG. 1, rockers 40 and 41 being of course situated on one side of the swivel bearing 26 of the gear-change lever 24. Legs 40A and 41A of both rockers 40 and 41 are interconnected by a relatively short connecting rod 42. On a locking lever 43 connected with the gear-change lever there are correspondingly provided locking grooves 44 and 45 opposite to each other. In this embodiment, the rockers 40 and 41 and possible additional rockers are almost in one plane.

Reference numerals

1: transmission housing
2: input shaft
3: countershaft
4: output shaft
5: gear on 2
6: gear on 3
7: gear on 3
8: gear on 3
9: gear clutch
10: gear on 3
11: gear on 3
12: gear on 4
13: gear on 4
14: gear on 4
15: gear On 4
16: gear on 4
17: gear clutch
18: gear clutch
19: sliding sleeve of 9
20: sliding sleeve of 17
21: sliding sleeve of 18
22: sliding pads
23: gear-change lever of 9
24: gear-change lever of 17
25: gear-change lever of 18
26: swivel bearings of 23 to 25
27: central selector and gear-shift shaft 28: shift finger on 27
29: locking lever on 23
30: locking lever on 24
31: locking lever on 25
32: locking groove
33: locking cams
34: rocker
34A: leg of 34
35: rocker
35A: leg of 35
36: swivel axes of 34 and 35
37: connecting rod
38: slot
39: slot
40: rocker
40A: leg of 40
41: rocker
41A: leg of 41
42: connecting rod
43: locking lever
44: locking groove
45: locking groove

We claim:

1. A gear-engaging device for a transmission of a motor vehicle, said gear-engaging device comprising:
   at least three gear-engaging elements (23, 24 and 25) each engaging a sliding sleeve (19, 20, 21), each gear-engaging element (23, 24 and 25) being pivotable about a swivel bearing (26), via at least one gear-shift shaft (27), from a neutral position to a shift position, and each swivel bearing (26) being mounted parallel to one another,
   a locking mechanism, situated in a housing of the transmission, coacting with a locking groove (32, 44, 45) formed in a locking lever (29, 30, 31; 43) secured to said gear-engaging element (23, 24, 25) so that when one of said at least three gear-engaging elements (23, 24 and 25) pivots into a shift position, the others of said at least three gear-engaging elements (23, 24 or 25) are locked in their neutral position,
   wherein said at least three gear-engaging elements (23, 24 and 25) define at least first and second pairs of adjacent gear-engaging elements with a first twin leg rocker (34 or 35; 40 or 41), which engages said locking grooves (32; 44, 45) via a locking detent (33) supported by each leg of said first twin leg rocker, situated between the first pair of adjacent gear-engaging elements, and a second twin leg rocker (35 or 34; 41 or 40), which engages said locking grooves (32; 44, 45) via a locking detent (33) supported by each leg of said second twin leg rocker, situated between the second pair of adjacent gear-engaging elements, said first and second twin leg rockers (34, 35; 40, 41) are mounted in said transmission housing (1) parallel to said swivel bearings (26), at least one of said locking levers (30; 43) has two opposed locking grooves (32; 44 and 45), and a first leg of said first twin leg rocker (34 or 35; 40 or 41) is positionable to engage a one of said two opposed locking grooves (32; 44 and 45) and a first leg of said second twin leg rocker (35 or 34; 41 or 40) is positionable to engage the other of said two opposed locking grooves (32; 44 and 45), and said first legs are interconnected by a transmission element.

2. A gear-engaging device for the transmission of a motor vehicle according to claim 1, wherein said two opposed locking grooves (32; 44 and 45) are situated on opposite sides of said swivel bearing (26).

3. A gear-engaging device for the transmission of a motor vehicle according to claim 1, wherein said locking grooves (44 and 45) are situated on one side of said swivel bearing (26).

4. A gear-engaging device for a transmission of a motor vehicle, said gear-engaging device comprising:
   at least three gear-engaging elements (23, 24 and 25) each engaging a sliding sleeve (19, 20, 21), each gear-engaging element (23, 24 and 25) being pivotable about a swivel bearing (26), via at least one gear-shift shaft (27), from a neutral position to a shift position, and each swivel bearing (26) being mounted parallel to one another,
   a locking mechanism, situated in a housing of the transmission, coacting with a locking groove (32, 44, 45) formed in a locking lever (29, 30, 31; 43) secured to said gear-engaging element (23, 24, 25) so that when one of said at least three gear-engaging elements (23, 24 and 25) pivots into a shift position, the others of said at least three gear-engaging elements (23, 24 or 25) are locked in their neutral position,
   wherein said at least three gear-engaging elements (23, 24 and 25) define at least first and second pairs of adjacent gear-engaging elements with one gear-engaging element common to both said pairs,
   a first twin leg rocker (34 or 35; 40 or 41), which engages said locking grooves (32; 44, 45) via a locking detent (33) supported by each leg of said first twin leg rocker, is situated between the first pair of adjacent gear-engaging elements, and a second twin leg rocker (35 or 34; 41 or 40), which engages said locking grooves (32; 44, 45) via a locking detent (33) supported by each leg of said second twin leg rocker, is situated between the second pair of adjacent gear-engaging elements, said first and second twin leg rockers (34, 35; 40, 41) are mounted in said transmission housing (1) parallel to said swivel bearings (26), and a first leg of said first twin leg rocker (34 or 35; 40 or 41) is positionable to engage a locking groove (32; 44 and 45) of the common gear-engaging element (24) and a first leg of said second twin leg rocker (35 or 34; 41 or 40) is positionable to engage another locking groove (32; 44 and 45) of the common gear-engaging element, and said first legs are interconnected by a transmission element comprising a connecting rod (37; 42) articulated to both of said first legs (34A and 35A; 40A and 41A).

5. A gear-engaging device for the transmission of a motor vehicle according to claim 4, wherein said connecting rod (37; 42) is articulated to one of said first legs (34A, 35A; 40A, 41A) via a slot (38).

6. A gear-engaging device for the transmission of a motor vehicle according to claim 4, wherein said connecting rod (37) is supported on said swivel bearing (26) of one of said gear-engaging levers (24) via a slot (39).

* * * * *